US009429295B2

(12) United States Patent
Ahn

(10) Patent No.: US 9,429,295 B2
(45) Date of Patent: Aug. 30, 2016

(54) LIGHTING APPARATUS

(75) Inventor: Teajeong Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 276 days.

(21) Appl. No.: 13/594,729

(22) Filed: Aug. 24, 2012

(65) Prior Publication Data

US 2013/0301259 A1 Nov. 14, 2013

(30) Foreign Application Priority Data

May 9, 2012 (KR) ........................ 10-2012-0049195

(51) Int. Cl.

| | |
|---|---|
| ***B60Q 1/06*** | (2006.01) |
| ***F21V 5/04*** | (2006.01) |
| ***F21V 29/02*** | (2006.01) |
| ***F21K 99/00*** | (2016.01) |
| ***F21V 29/83*** | (2015.01) |
| *F21V 29/67* | (2015.01) |
| *F21V 29/508* | (2015.01) |
| *F21V 29/503* | (2015.01) |
| *F21Y 101/02* | (2006.01) |

(52) U.S. Cl.

CPC ................. *F21V 5/04* (2013.01); *F21K 9/137* (2013.01); *F21V 29/02* (2013.01); *F21V 29/83* (2015.01); *F21V 29/503* (2015.01); *F21V 29/508* (2015.01); *F21V 29/67* (2015.01); *F21V 29/673* (2015.01); *F21V 29/677* (2015.01); *F21Y 2101/02* (2013.01)

(58) Field of Classification Search

CPC ............... F21V 29/025; F21V 29/027; F21V 29/2293; F21V 29/02; F21V 29/22; F21V 29/2268; F21V 29/2262; F21V 29/40; F21V 29/503; F21V 29/506; F21V 29/507; F21V 29/508; F21V 29/67; F21V 29/673; F21V 29/677; F21V 29/83; F21K 9/137

USPC ........ 362/294, 345, 373, 249.02; 313/45, 46

See application file for complete search history.

(56) References Cited

U.S. PATENT DOCUMENTS 8,319,408 B1 * 11/2012 Horng ............................. 313/46
8,439,531 B2 * 5/2013 Trott et al. .................... 362/364

(Continued)

FOREIGN PATENT DOCUMENTS

JP 2008-78035 4/2008
JP 2011-249304 12/2011

(Continued)

OTHER PUBLICATIONS

Korean Notice of Allowance issued in related Application No. 10-2012-0049195 dated May 19, 2014.

*Primary Examiner* — Evan Dzierzynski
*Assistant Examiner* — James Endo
(74) *Attorney, Agent, or Firm* — Ked & Associates, LLP

(57) ABSTRACT

A lighting apparatus including a body having a cavity, a plurality of LEDs, a substrate provided in the cavity and having a first surface and a second surface opposite the first surface. The plurality of LEDs provided on the first surface, a fan provided below the second surface to face the second surface, wherein the body includes a partition positioned between a side surface of the cavity and the substrate, the partition extending to the fan to form a first air passage between the side surface of the cavity and the partition and a second air passage between the partition and the substrate, and wherein the first air passage is in communication with a first side of the fan and the second air passage is in communication with a second side of the fan.

15 Claims, 4 Drawing Sheets

(56) References Cited

U.S. PATENT DOCUMENTS

| | | | | |
|---|---|---|---|---|
| 8,610,339 | B2 * | 12/2013 | Fang et al. | 313/35 |
| 2009/0046473 | A1 * | 2/2009 | Tsai et al. | 362/373 |
| 2010/0020537 | A1 * | 1/2010 | He et al. | 362/234 |
| 2010/0171403 | A1 * | 7/2010 | Yang et al. | 313/46 |
| 2010/0232168 | A1 * | 9/2010 | Horng et al. | 362/373 |
| 2011/0037368 | A1 * | 2/2011 | Huang | 313/46 |
| 2011/0051414 | A1 * | 3/2011 | Bailey et al. | 362/235 |
| 2011/0267829 | A1 * | 11/2011 | Horng et al. | 362/373 |
| 2012/0013237 | A1 * | 1/2012 | Lee | 313/46 |
| 2012/0033419 | A1 * | 2/2012 | Kim et al. | 362/235 |
| 2012/0044642 | A1 * | 2/2012 | Rodriguez | 361/692 |
| 2012/0062095 | A1 * | 3/2012 | Horng | 313/46 |
| 2012/0146481 | A1 * | 6/2012 | Li et al. | 313/46 |
| 2012/0170263 | A1 * | 7/2012 | Rodriguez | 362/230 |
| 2012/0287651 | A1 * | 11/2012 | Hirata | 362/373 |
| 2012/0299456 | A1 * | 11/2012 | Horng | 313/46 |
| 2013/0107531 | A1 * | 5/2013 | Breidenassel et al. | 362/249.02 |

FOREIGN PATENT DOCUMENTS

| | | |
|---|---|---|
| KR | 10-0927114 | 11/2009 |
| KR | 10-2011-0107390 | 9/2011 |

* cited by examiner

LIGHTING APPARATUS

CROSS-REFERENCE TO RELATED APPLICATION(S)

This application claims the benefit of the Patent Korean Application No. 10-2012-0049195, filed in Korea on May 9, 2012, which is hereby incorporated by reference as if fully set forth herein.

BACKGROUND

1. Field

A lighting apparatus is disclosed herein.

2. Background

Lighting apparatuses are known. However, they suffer from various disadvantages.

BRIEF DESCRIPTION OF THE DRAWINGS

The embodiments will be described in detail with reference to the following drawings in which like reference numerals refer to like elements wherein.

DETAILED DESCRIPTION

A lighting apparatus is described herein with reference to the attached drawings. Wherever possible, the same reference numbers are used throughout the drawings to refer to the same or like parts, repetitive description of which will be omitted, and, for convenience of description, a size or a shape of a member may be shown exaggerated or not to scale, perfectly.

Moreover, though terms including ordinal numbers, such as first or second, can be used for describing various elements, the elements are not confined by the terms, but are used merely to distinguish one element from other elements.

Traditionally, various types of light sources have been used for lighting including discharge lamps, and fluorescent lamps. These light sources may be used for various applications such as domestic, landscape and industrial purposes.

Among the various types of light sources, resistive type light sources, such as the incandescent lamps, have problems of poor efficiency and substantial heat generation, the discharge lamps have problems of a high price and a high voltage, and the fluorescent lamps may be harmful to the environment due to its use of mercury.

In order to solve the drawbacks of the light sources, interest in a light emitting diode (LED) is increasing, which has advantages in efficiency, variety of colors, autonomy of design, and so on. The LED is a semiconductor device which emits light when a forward bias voltage is applied thereto. LED, may have a longer lifetime, lower power consumption, and electric, optical, and physical characteristics suitable for mass production. Hence, LED based light sources have replaced the incandescent lamps and the fluorescent lamps, in various applications.

However, the LED generates a large amount of heat during operation which may cause poor efficiency if the heat is not sufficiently dissipated away from the LED. In order to solve the problem, an LED based lighting apparatus may be provided with a heat sink.

However, the heat sink may increase the weight of the lighting apparatus as the heat sink is formed of metal, and may increase production costs. For example, increases in the size of the heat sink to improve performance may also increase the overall size of the lighting apparatus, as well as the amount of metal needed, hence increasing production costs.

Consequently, a heat sink structure is required, which can contribute to make the lighting apparatus slimmer and lighter, while providing effective dissipation of heat. Accordingly, an object of the present disclosure is to provide lighting apparatus which has improved heat dissipation while minimizing the amount of metal required for the heat sink. Another object of the present disclosure is to provide lighting apparatus which enables easy repair and replacement of components.

Figure 1:
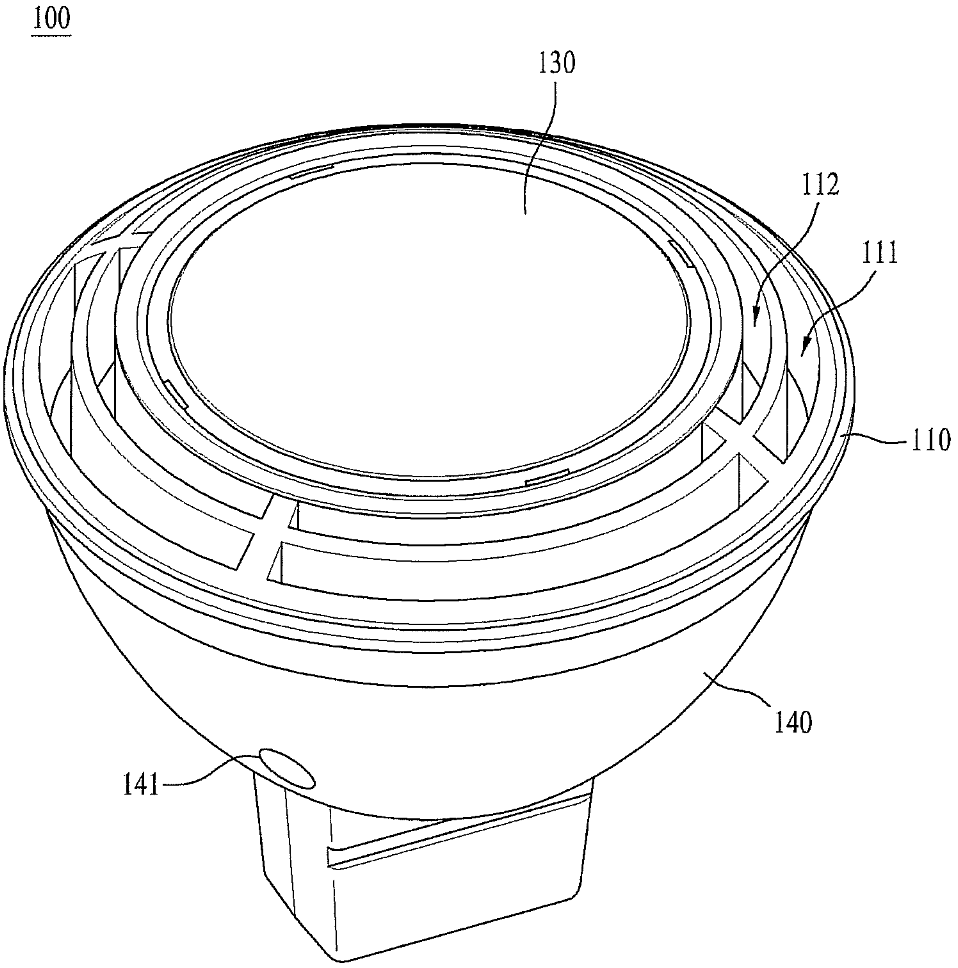
FIG. 1 is a perspective view of a lighting apparatus according to an embodiment of the present disclosure.
Figure 2:
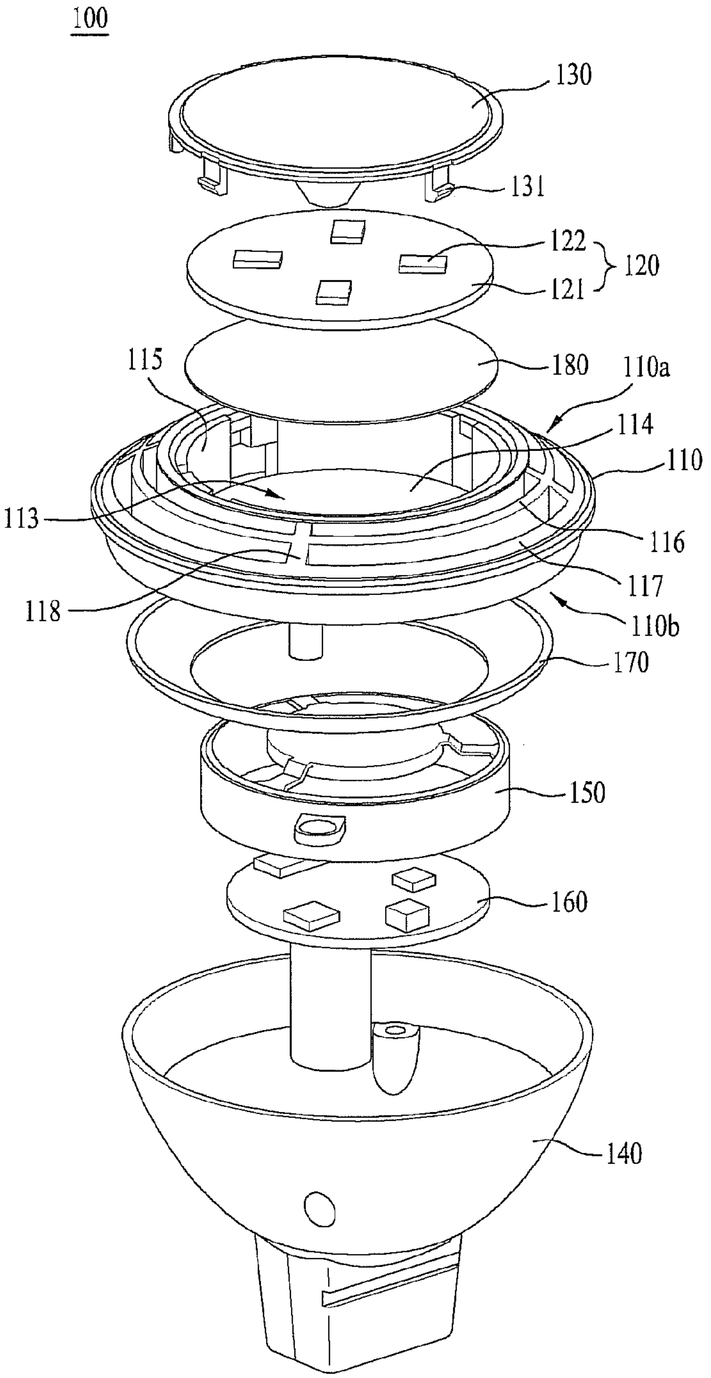
FIG. 2 is an exploded perspective view of the lighting apparatus of FIG. 1.
Figure 3:
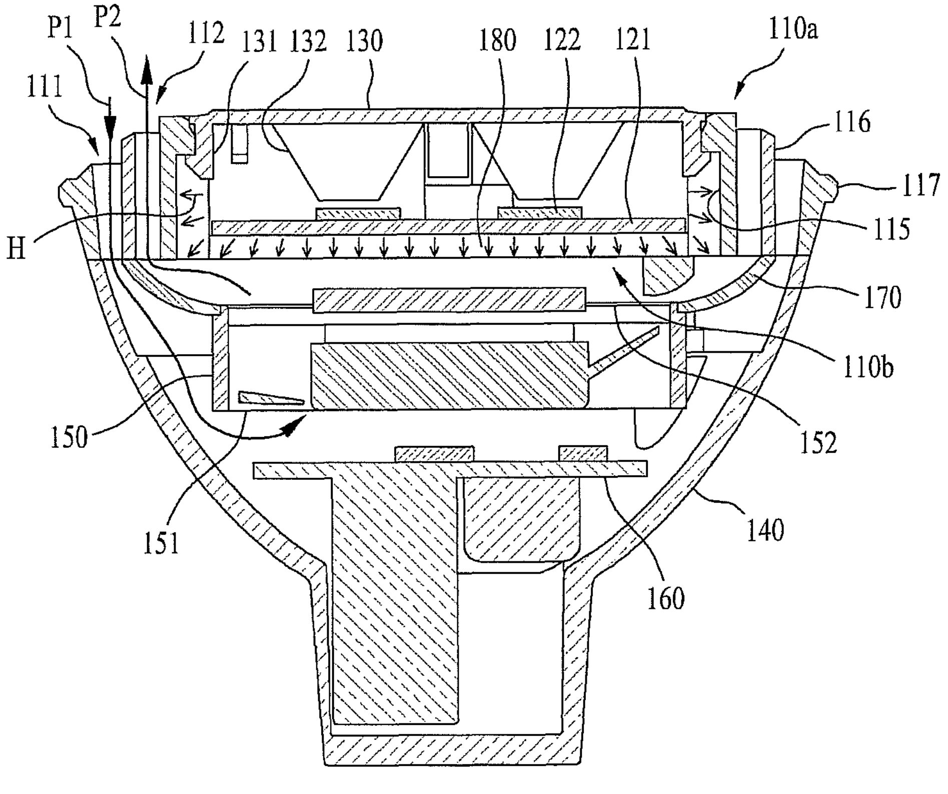
FIG. 3 is a sectional view of the lighting apparatus of FIG. 1.

FIG. 1 is a perspective view of a lighting apparatus of one embodiment of the present disclosure, FIG. 2 is an exploded perspective view of the lighting apparatus of FIG. 1, and FIG. 3 is a sectional view of a lighting apparatus of FIG. 1.

The lighting apparatus 100 may include a heat sink 110, a light emitting unit 120, a housing 140, an air flow generating unit 150, an electronic module 160, and a flow passage guide 170. The light emitting unit 120 may include a substrate 121 and a plurality of LEDs 122 mounted on the substrate 121. A heat sink 110 may have a first side 110*a* (mounting surface) on which the light emitting unit 120 may be mounted and a second side 110*b* (bottom surface) at an opposite position to the first side 110*a*. The first side 110*a* may be an upper region of the heat sink 110 and the second side 110*b* may be a lower region of the heat sink 110. A housing 140 may be mounted to the second side 110*b* to form a predetermined space (cavity). An electric module 160 may be arranged in the cavity. An air flow generating unit 150 (fan) may be arranged over the housing 140, and a flow passage guide 170 may be arranged between the air flow generating unit 150 and the heat sink 110.

In this instance, the heat sink 110 may have an air inlet 111 and an air outlet 112 provided adjacent to each other to pass through the first side 110*a* and the second side 110*b*, respectively. The flow passage guide 170 may connect the air inlet 111 and an introduction portion 151 (inlet) of the air flow generating unit 150, and the air outlet 112 and a discharge portion 152 (outlet) of the air flow generating unit 150.

The light emitting unit 120, the air outlet 112 and the air inlet 111 may be positioned at or about a center axis of the heat sink 110. The air outlet 112 and air inlet 111 may be positioned to be concentric. The air inlet 111 and the air outlet 112 may have radial shapes, or rectangular shapes each having a predetermined curvature to surround the light emitting unit 120, respectively. The light emitting unit 120, the air outlet 112 and the air inlet 111 may be positioned at different heights relative to the heat sink 110.

The lighting apparatus 100, a first flow passage P1 formed to connect the air inlet 111, a space between the housing 140 and the electronic module 160, and the inlet 151 of the fan 150. A second flow passage P2 may be formed to connect the outlet 152 of the fan 150, a space between the second side 110*b* of the heat sink 110 and the fan 150, and the air outlet 112. A flow passage guide 170 may be arranged in the housing to partition the first flow passage P1 and the second flow passage P2. The flow passage guide 170 may be referred to as a divider, partition or shroud.

Elements of the lighting apparatus 100 will be described, with reference to the attached drawings, in detail.

The light emitting unit 120 may include a substrate 121 and a plurality of LEDs 122 mounted on the substrate 121. And, the light emitting unit 120 may have a surface provided with a reflective layer. The reflective layer may be a reflective film, a coating, or another appropriate reflective surface. The reflective film may have a plurality of holes for exposing the LEDs 122, and it may enclose the entire surface of the light emitting unit 120 except the LEDs 122.

The heat sink 110 has a function of dissipating heat from the light emitting unit 120 to an outside of the lighting apparatus 100, and may be formed of a metal or resin having good heat conductivity. And, the heat sink 110 may have an outside circumferential surface provided with a plurality heat dissipation fins for increasing a surface area for heat dissipation.

The heat sink 110 may include the first side 110*a* with the light emitting unit 120 mounted thereon, and the second side 110*b* positioned opposite to the first side 110*a*. The heat sink 110 may have the air inlet 111 and the air outlet 112 each formed to allow air to flow through the heat sink, e.g., between the first side 110*a* and the second side 110*b*. The air inlet 111 and the air outlet 112 may be provided adjacent to each other.

The first side 110*a* (e.g., top side) of the heat sink 110 may be divided into a region having the light emitting unit 120 mounted therein and a region having the air inlet 111 and the air outlet 112 provided therein. The region having the light emitting unit 120 mounted therein may be a recess 113 formed on the first side 110*a* of the heat sink 110. Moreover, the region having the air inlet 111 and the air outlet 112 provided therein may be sloped surfaces each having a predetermined slope angle.

Referring to FIG. 2, the heat sink 110 may include the recess 113 formed at the first side 110*a* to have the light emitting unit 120 provided thereon. The recess 113 may be defined by a side surface 115 (also referred to herein as a side 115 and side wall 115). A first side wall 116 (divider wall) may be positioned a prescribed distance from the side surface 115 of the recess 113, and a second side wall 117 (outer wall) may be positioned spaced from the first side wall 116. The first side wall 116 may be referred to as a partition as it partitions a space formed between the side wall 115 of the recess and the outer wall 117 of the heat sink 110.

And, the heat sink 110 may include a connecting member 118 connecting the side 115 of the recess 113, the first side wall 116 and the second side wall 117. The connecting member 118 may extend in a radial direction of the heat sink 110 to connect the side of the recess 113, the first side wall 116 and the second side wall 117. The heat sink 110 may have one or more connecting members 118. Each connecting member 118 may be positioned a prescribed distance from each other. The number and location of the connecting members 110 may be determined to maximize the size of the air passage or for aesthetic considerations.

The air inlet 111 and the air outlet 112 may span from the first side 110*a* to the second side 110*b* of the heat sink 110. The air outlet 112 may be provided between the side 115 of the recess 113 and the first side wall 116, and the air inlet 111 may be provided between the first side wall 116 and the second side wall 117.

In detail, the air outlet 112 may be constructed of the side wall 115 of the recess 113, the first side wall 116, and the connecting member 118. The air inlet 111 may be constructed of the first side wall 116, the second side wall 117 and the connecting member 118. That is, the light emitting unit 120 may be arranged at a center of the heat sink 110, and the air outlet 112 and the air inlet 111 may be provided to surround the light emitting unit 120.

As previously described, the light emitting unit 120, the air outlet 112, and the air inlet 111 may be positioned at or about a center axis of the heat sink 110 to be concentric relative to each other. For example, the air outlet 112 may be positioned around the light emitting unit 120 and the air inlet 111 may be positioned around the air outlet 112.

And, the first side wall 116 may have a height greater than a height of the second side wall 117, the side 115 (or side wall) of the recess 113 may have a height greater than a height of the first side wall 116. The difference in height of the side walls 116 and 117 may make the height of the air inlet 111 and the air outlet 112 to be different. Such a structure may prevent interference between the air flowing into the heat sink and air flowing out of the heat sink even if the air inlet 11 and the air outlet 112 are positioned adjacent to each other.

The heat sink 110 may have a cylindrical shape. The recess 113 may be formed by the side wall 115 and a bottom surface 114. The light emitting unit 120 may be mounted on the bottom surface 114 of the recess 113, and a heat conductive pad 180 may be provided between the light emitting unit 120 and the bottom of the recess 113. The heat conductive pad 180 may improve transfer of heat H from the light emitting unit 120 to the heat sink 110.

The lens unit 130 (cover) may have a function of guiding a light from the light emitting unit 120 to an outside of the lighting apparatus 100, and may include at least one condenser lens 132. The lens unit 130 may be detachably mounted to the side 115 of the recess 113. For this, the lens unit 130 may include hook portions 131 provided thereto, and the side 115 of the recess 113 may have notch portions to receive the hooks 131.

The housing 140 may be mounted at the second side 110*b* (e.g., bottom side) of the heat sink 110. A predetermined space may be formed between the second side 110*b* of the heat sink 110 and the housing 140. The electronic module 160 may be arranged in the housing 140 for supplying power to the light emitting unit 120. And, the air flow generating unit 150 may be arranged between the second side 110*b* of the heat sink 110 and the electronic module 160, and the flow passage guide 170 may be arranged between the air flow generating unit 150 and the second side 110*b* of the heat sink 110.

The air flow generating unit 150 may be a fan, and the air flow generating unit 150 may be arranged to have the inlet portion 151 facing the electronic module 160 and the discharge portion 152 facing to the second side 110*b* of the heat sink 100. The fan may be a conventional fan or a bladeless fan or air mover. Moreover, the housing 140 may be mounted to the second side wall 117, and the flow passage guide 170 may be mounted to the first side wall 116.

Referring to FIG. 3, the lighting apparatus 100 having above structure may have a first flow passage P1 and a second flow passage P2 formed therein. The first flow passage P1 may be formed to connect the air inlet 111, a space between the housing 140 and the electronic module 160, and the inlet portion 151 of the fan 150. The second flow passage P2 may be formed to connect the outlet portion 152 of the fan 150, a space between the second side 110*b* of the heat sink 110 and the fan 150, and the air outlet 112.

In the meantime, the flow passage guide 170 may separate the first flow passage P1 and the second flow passage P2. The flow passage guide 170 may be referred to herein as a divider, partition, or shroud. The flow passage guide 170 may have a ring shape. The flow passage guide 170 may extend from the heat sink 110 to the fan 150. For example, the flow passage guide 170 may be in contact with the first side wall 116 of the heat sink 110, and in contact with the fan 150 at the outlet portion 152.

And, the flow passage guide 170 may have a prescribed shape in which the diameter of the flow passage guide 170 decreases from the heat sink 100 to the fan 150. For example, the diameter of the flow passage guide 170 may be greatest where it makes contact with the heat sink 110, and smallest where it makes contact with the fan 150. The flow passage guide 170 may have a bowl shape, cone shape, or the like.

The flow passage guide 170 may prevent the air introduced through the air inlet 111 from flowing to a space between the outlet portion 152 of the fan 150 and the second side **110*b* of the heat sink 110. And, the flow passage guide 170 also prevents the air flowing through a space among the outlet portion 152 of the fan 150, the second side 110*b* of the heat sink 110, and the air flow generating unit 150 from flowing toward the air inlet 111. In other words, the flow passage guide 170 divides the cavity inside the lighting apparatus 100 to form a portion of the first air flow passage P1 and the second air flow passage P2**.

If the fan 150 is put into operation, external air may be introduced to an inside of the housing 140 through the air inlet 111 of the heat sink 110. In this instance, owing to the flow passage guide 170, the external air may flow to the inlet portion 151 of the fan 150 through a space between the housing 140 and the flow passage guide 170, e.g., a space at the electronic module 160 side.

When the light emitting unit 120 is operational, heat generated by the light emitting unit 120 may be transferred to the heat sink 100. The fan 150 may be operated to force air to flow into the cavity along the first air flow passage P1. The fan 150 may blow air towards the heat sink 100, forcing the air to flow out of the cavity along the second air flow passage P2. As the air circulates through the first and second air flow passages P1, P2 heat is absorbed to improve the thermal efficiency of the heat sink 100.

In more detail, upon supply of power to the light emitting unit 120, the light emitting unit 120 may generate heat. The heat H may be transferred by conduction along the bottom 114 and the side wall 115 of the recess 113 of the heat sink 110, and the first side wall 116. The external air introduced through the air inlet 111 may absorb the heat as the external air passes through the first air flow passage P1 along the first side wall 116 and the second side wall 117. The air then flows to the inlet portion 151 of the fan 150.

Then, the air discharged through the outlet portion 152 of the fan 150 may flow through the second air flow passage P2 (e.g., a space among the second side **110*b* of the heat sink 110, the fan 150, and the flow passage guide 170), and, discharged to an outside of the lighting apparatus 100 through the air outlet 112 of the heat sink 110. In this instance, the air absorbs heat as it flows through the second flow passage P2 from the surfaces of the heat sink 110**.

The housing 140 may have a plurality of openings 141 (flow holes) provided therein. When the fan 150 is in operation, the external air may be introduced to the inside of the housing 140 through the openings 141. The air may pass through the electronic module 160, and flow to the inlet portion 153 of the fan 150. The openings 141 may have a round shape, a rectangular shape, or another appropriate shape. Moreover, the openings 141 may be positioned on the surface of the housing 140 in close proximity to the inlet of the fan.

Owing to the fan 150, the heat can be dissipated from the light emitting unit 120 and the electronic module 160 more effectively. For example, in a case where the fan 150 is driven at a rated voltage of 3.3V in the lighting apparatus 100 having above described structure, a temperature of the substrate 121 may be 65.5° C. or less, and an air temperature at a surface of the heat sink 110 may be 26.8° C. or less.

As has been described, the lighting apparatus 100 may improve dissipation of heat from the light emitting unit and the electronic module. Moreover, because the heat sink 110 is formed separately from the housing 140, component and manufacturing costs may be reduced. The lighting apparatus 100 may also enable easy repair and replacement of components.

Figure 4:
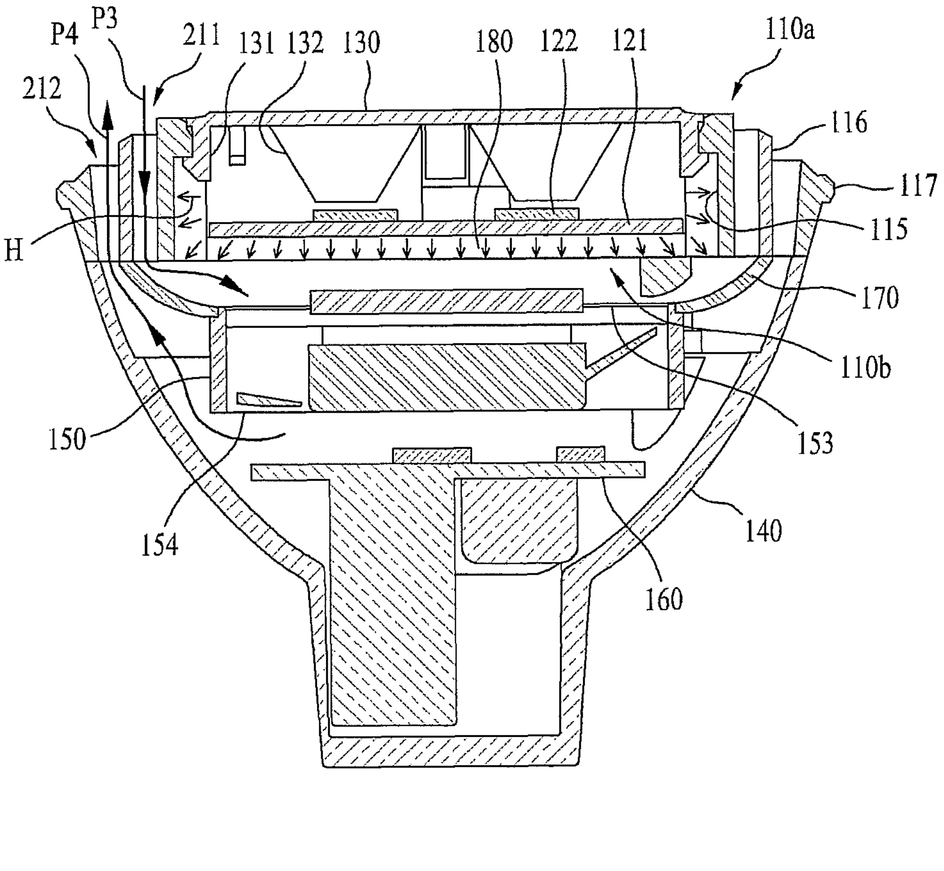
FIG. 4 is a sectional view of a lighting apparatus according to one embodiment of the present disclosure.

FIG. 4 is a sectional view of a lighting apparatus according to one embodiment of the present disclosure. In contrast to the embodiment of FIGS. 1 to 3 as previously described, in this embodiment, the positions of an air inlet 211 and an air outlet 212 may be exchanged with each other.

In detail, the light emitting unit 120, the air inlet 211 and the air outlet 212 may be positioned from a center axis of the heat sink 110. The air inlet 211 and air outlet 212 may be formed concentrically with respect to the center axis of the heat sink 110. In this instance, the air flow generating unit 150 (fan) may have the introduction portion 153 (inlet) arranged to face the heat sink 110, and discharge portion 154 (outlet) may face the housing 140 has the electronic module 160.

In such a configuration, the flow passage guide 170 arranged in the housing to partition a first flow passage P3 and a second flow passage P4. The first flow passage P3 may be formed to connect the air inlet 211, a space between the second side **110*b* of the heat sink 110 and the fan 150, and the introduction portion 153 of the fan 150. The second flow passage P4 may be formed to connect the discharge portion 154 of the fan 150, a space between the housing 140 and the electronic module 160, and the air outlet 212**.

As previously described, the heat sink 110 may include a recess 113 formed at the first side **110*a* of the heat sink 110. The light emitting unit 120 may be mounted in the recess 113, the heat sink 110 may further include a first side wall 116 positioned a prescribed distance from the side wall 115 of the recess 113, and a second side wall 117 positioned a prescribed distance from the first side wall 116. The first side wall 115 may be referred to as a partition and the second side wall 117 may form the exterior surface of the heat sink 110**.

In this instance, an air inlet 211 may be provided between the side wall 115 of the recess 113 and the first side wall 116, and an air outlet 212 provided between the first side wall 116 and the second side wall 117. That is, with respect to the embodiment of FIGS. 1 to 3, the air inlet 211 and the air outlet 212 are exchanged, and positions of the inlet 153 and the outlet 154 of the fan 150 are exchanged.

And, as previously described, the housing 140 may be mounted to the second side wall 117 and the flow passage guide 170 may be mounted to the first side wall 116. The first side wall 116 may have a height greater than the second side wall 117, and the side wall 115 of the recess 113 may have a height greater than a height of the first side wall 116. That is, the light emitting unit 120, the air outlet 212, and the air inlet 211 may respectively be provided at positions having predetermined height differences. Hence, even if the air outlet 212 and the air inlet 211 are positioned adjacent to each other, interference between airflow through air inlet and air outlet may be reduced.

And, the flow passage guide 170 may partition the first flow passage P3 and the second flow passage P4. The flow passage guide 170 (divider) may have a ring shape. The flow passage guide 170 may make contact with the first side wall 116 of the heat sink 110, and may make contact with the inlet 153 of the fan 150.

A process of heat H dissipation from the light emitting unit 120 will be described in detail with reference to FIG. 4. The heat H may be transferred along the bottom 114 and the side wall 115 of the recess 113, and the first side wall 116 by conduction. The ambient air introduced to the lighting apparatus 100 through the air inlet 211 may absorb the heat as it flows along the side wall 115 of the recess 113 and the first side wall 116 and into the inlet 153 of the fan 150.

Then, the air, discharged through the outlet 154 of the fan 150, may flow through a space between the electronic module 160 and the housing 140, and may be discharged through the air outlet 212 of the heat sink 110 and out of the lighting apparatus. In such a process, the heat may be dissipated from the electronic module more efficiently.

In summary, ambient air drawn into the housing 140 may transfer heat from the light emitting unit 120 to the outside as it flows through a space among the second side 110*b* of the heat sink 110, the fan 150, and flow passage guide 170. Moreover, the air flow may also dissipate the heat from the electronic module 160 to the outside of the lighting apparatus as it flows through a space between the housing 140 and the electronic module 160.

A lighting apparatus as broadly described and embodied herein may improve dissipation of heat from a light emitting unit and an electronic module. The amount of metal used in the heat sink may be reduced, thereby reducing costs. The lighting apparatus may also enable easy repair and facilitate replacement of components.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, a lighting apparatus as embodied and broadly described herein may include a body having a cavity, a plurality of LEDs, a substrate provided in the cavity and having a first surface and a second surface opposite the first surface, the plurality of LEDs provided on the first surface, a fan provided below the substrate to face the second surface, and a divider having a ring shape positioned on the fan to form a first air passage along the body and a second air passage along the substrate, wherein the first air passage may be in communication with a first side of the fan and the second air passage may be in communication with a second side of the fan. The lighting apparatus may further include an electric module provided in the cavity below the fan. The first and second air passages may be positioned to circumferentially surround an edge of the substrate. The divider may be positioned to extend from an opening of the cavity to the fan.

A heat sink may be provided over the fan, wherein the substrate may be positioned on a surface of the heat sink, and the first and second air flow passages are positioned to surround an outer circumference of the heat sink. The heat sink includes a first wall provided around the substrate, a second wall provided around the first wall, a third wall provided around the second wall, the first and second wall forming a portion of the second air flow passage and the second and third walls forming a portion of the first air flow passage.

The first, second, and third walls of the heat sink may be positioned concentric to a center axis of the body. The first, second, and third walls of the heat sink may be positioned concentric to a center axis of the body. A height of the first, second, and third walls of the heat sink may be different. Moreover, the first side wall may have a height higher than a height of the second side wall, and the side of the recess may have a height higher than the height of the first side wall.

The third wall of the heat sink may be mounted to an upper surface of the body and the divider may be connected to the heat sink to extend from the second wall of the heat sink to the fan. A width of the divider may decrease from the heat sink to the fan. A width of the divider may be greatest at the distal end connected to the heat sink and smallest at the distal end connected to the fan.

The heat sink and the body may be integrally formed. The lighting apparatus may further include a lens detachably mounted to the first wall of the heat sink. Moreover, the body includes a plurality of openings formed on a side surface of the body.

The fan may be configured to generate air flow from the first air passage to the second air passage to blow air towards the heat sink. The fan may be configured to generate air flow from the second air passage to the first air passage to blow air away from the heat sink. The lighting apparatus may further include an electric module provided below the fan, wherein the fan blows air toward the electric module.

In one embodiment, a lighting apparatus including a body, a heat sink provided over the body, a light emitting module mounted on the heat sink, and a fan provided below the heat sink in the body, wherein the heat sink includes a first surface provided around the light emitting module, a second surface provided around a circumference of the first surface and positioned a prescribed distance from the first surface, and a third surface provided around a circumference the second surface and positioned a prescribed distance from the second surface, wherein the fan circulates the air in the body from a first channel formed between the first and second surfaces to a second channel formed between the second and third surfaces.

In one embodiment, a lighting apparatus may include a light emitting unit having a substrate and a plurality of LEDs mounted on the substrate, a heat sink having a first side with the light emitting unit mounted thereon and a second side at an opposite position to the first side, a housing mounted to the second side to form a predetermined space, an air flow generating unit arranged in the housing, and a flow passage guide arranged between the air flow generating unit and the heat sink.

In this instance, the heat sink may have an air inlet and an air outlet provided adjacent to each other each to pass through the first side and the second side, the flow passage guide may connect the air inlet and the introduction portion, and the air outlet and the discharge portion of the air flow generating unit. The light emitting unit, the air outlet, and the air inlet may be positioned, in that order, in above order in a direction moving away from a center axis of the heat sink. The air outlet and the air inlet may have radial shapes to surround the light emitting unit, respectively. And, the light emitting unit, the air outlet, and the air inlet may be provided at positions having predetermined height differences in a length direction of the heat sink, respectively.

The air flow generating unit may have the discharge portion arranged to face the second side of the heat sink, and the housing may have an electronic module arranged on an introduction portion side of the air flow generating unit. The flow passage guide may be arranged in the housing to partition a first flow passage and a second flow passage, wherein the first flow passage is formed to connect the air inlet, a space between the housing and the electronic module, and the introduction portion of the air flow generating unit, and the second flow passage is formed to connect the discharge portion of the air flow generating unit, a space between the second side of the heat sink and the air flow generating unit, and the air outlet.

The heat sink may include a recess formed in the first side to have the light emitting unit arranged thereon, a first side wall positioned spaced from the side of the recess, and a second side wall positioned spaced from the first side wall. In this instance, the air outlet may be provided between the side of the recess and the first side wall, and the air inlet may be provided between the first side wall and the second side wall.

The housing may be mounted to the second side wall, and the flow passage guide may be mounted to the first side wall. The flow passage guide may have a cross section, an area of which becomes smaller as the flow passage guide goes from the first side wall toward the air flow generating unit. The flow passage guide may have a region with a largest diameter in contact with the first side of the heat sink, and a region with a smallest diameter in contact with the air flow generating unit. Moreover, the first side wall may have a height higher than a height of the second side wall, and the side of the recess may have a height higher than the height of the first side wall. The lighting apparatus may further include a lens unit detachably mounted to the side of the recess. The housing may have a plurality of flow holes provided therein.

In one embodiment, the light emitting unit, the air inlet, and the air outlet may be provided to position in above order in a direction moving away from a center axis of the heat sink. The air flow generating unit may have the introduction portion arranged to face the second side of the heat sink, and the housing has the electronic module arranged on a discharge portion side of the air flow generating unit.

The flow passage guide may be arranged in the housing to partition a first flow passage and a second flow passage, wherein the first flow passage is formed to connect the air inlet, a space between the second side of the heat sink and the air flow generating unit, and the introduction portion of the air flow generating unit, and the second flow passage is formed to connect the discharge portion of the air flow generating unit, a space between the housing and the electronic module, and air outlet.

The heat sink may include a recess formed in the first side to have the light emitting unit arranged thereon, a first side wall positioned spaced from the side of the recess, and a second side wall positioned spaced from the first side wall. In this instance, the air inlet may be provided between the side of the recess and the first side wall, and the air outlet may be provided between the first side wall and the second side wall.

The housing is mounted to the second side wall, and the flow passage guide may be mounted to the first side wall. The first side wall may be formed to have a height higher than a height of the second side wall, and the side of the recess may have a height higher than the height of the first side wall.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting apparatus comprising:
- a body having a cavity;
- a plurality of LEDs;
- a substrate provided over the body and having a first surface and a second surface opposite the first surface, the plurality of LEDs provided on the first surface;
- a fan provided below the substrate to face the second surface;
- a heat sink provided over the fan;
- an electric module provided in the cavity below the fan; and
- a divider having a ring shape positioned between the heat sink and the fan to form a first air passage along the body and a second air passage along the substrate,
- wherein the first air passage is in communication with a first side of the fan and the second air passage is in communication with a second side of the fan, and
- wherein the body includes at least one opening formed on a side surface of the body such that external air introduced to an inside of the body through the at least one opening passes through the electric module,
- wherein the divider has a bowl shape or cone shape, and a diameter of the divider gradually decreases from the heat sink to the fan, and
- wherein the diameter of the divider is greatest where the divider contacts with the heat sink and smallest where the divider contacts with the fan,
- wherein the heat sink includes a first wall provided around substrate, a second wall provided around the first wall, a third wall provided around the second wall, the first and second wall forming a portion of the second air flow passage and the second and third walls forming a portion of the first air flow passage,
- wherein the first wall has a height higher than a height of the second wall, and the second wall has a height higher than a height of the third wall, and
- wherein lower ends of the first wall, the second wall and the third wall are positioned on a line parallel to the substrate.

2. The lighting apparatus of claim 1, wherein the first and second air passages are positioned to circumferentially surround an edge of the substrate.

3. The lighting apparatus of claim 1, wherein the divider is positioned to extend from an opening of the cavity to the fan.

4. The lighting apparatus of claim 1, wherein the substrate is positioned on a surface of the heat sink, and the first and second air passages are positioned to surround an outer circumference of the heat sink.

5. The lighting apparatus of claim 4, wherein the first, second, and third walls of the heat sink are positioned concentric to each other.

6. The lighting apparatus of claim 4, wherein the first, second, and third walls of the heat sink are positioned concentric to a center axis of the body.

7. The lighting apparatus of claim 4, wherein the third wall of the heat sink is mounted to an upper surface of the body and the divider is connected to the heat sink to extend from the second wall of the heat sink to the fan.

8. The lighting apparatus of claim 7, wherein a width of the divider decreases from the heat sink to the fan.

9. The lighting apparatus of claim 7, wherein a width of the divider is greatest at a distal end connected to the heat sink and smallest at a distal end connected to the fan.

10. The lighting apparatus of claim 1, wherein the heat sink and the body are integrally formed.

11. The lighting apparatus of claim 1, further comprising a lens detachably mounted to the first wall of the heat sink.

12. The lighting apparatus of claim 1, wherein the fan is configured to generate air flow from the first air passage to the second air passage to blow air towards the heat sink.

13. The lighting apparatus of claim 1, wherein the fan is configured to generate air flow from the second air passage to the first air passage to blow air away from the heat sink.

14. The lighting apparatus of claim 13, wherein the fan blows air toward the electric module.

15. A lighting apparatus comprising:

a body having a cavity;

a substrate provided over the body and having a plurality of LEDs provided on the substrate;

a heat sink provided over the body;

a light emitting module mounted on the heat sink;

a fan provided below the heat sink in the body; and a divider positioned between the heat sink and the fan to form a first air passage along the body and a second air passage along the substrate; and an electric module provided in the cavity below the fan, wherein the heat sink includes a first surface provided around the light emitting module, a second surface provided around a circumference of the first surface and positioned a prescribed distance from the first surface, and a third surface provided around a circumference the second surface and positioned a prescribed distance from the second surface, wherein the fan circulates the air in the body from a first channel formed between the first and second surfaces to a second channel formed between the second and third surfaces, and wherein the first surface has a height higher than a height of the second surface, and the height of the second surface is higher than a height of the third surface, wherein the body includes at least one opening formed on a side surface of the body such that external air introduced to an inside of the body through the at least one opening passes through the electric module, wherein the divider has a bowl shape or cone shape, and a diameter of the divider gradually decreases from the heat sink to the fan, wherein the diameter of the divider is greatest where the diameter contacts with the heat sink and smallest where the diameter contacts with the fan, and wherein lower ends of the first surface, the second surface and the third surface are positioned on a line parallel to the substrate.

* * * * *